(12) United States Patent
Maass

(10) Patent No.: US 6,409,247 B1
(45) Date of Patent: Jun. 25, 2002

(54) CONVERTIBLE VEHICLE WITH AN AT LEAST PARTIALLY FLEXIBLE ROOF AND AT LEAST ONE CROSS-CONNECTING SUPPORT

(75) Inventor: Joachim Maass, Bissendorf (DE)

(73) Assignee: Wilhelm Karmann GmbH, Osnabrueck (DE)

( * ) Notice: Subject to any disclaimer, the term of this patent is extended or adjusted under 35 U.S.C. 154(b) by 0 days.

(21) Appl. No.: 09/745,164

(22) Filed: Dec. 20, 2000

(51) Int. Cl.[7] .................................................. B60J 7/12
(52) U.S. Cl. ................................. 296/107.13; 296/116
(58) Field of Search .......................... 296/107.01, 108, 296/109, 114, 115, 107.09, 107.15, 117, 107.13, 107.14, 116

(56) References Cited

U.S. PATENT DOCUMENTS

| | | | | |
|---|---|---|---|---|
| 1,888,121 A | * | 11/1932 | Graham | 296/107.13 |
| 2,833,593 A | * | 5/1958 | Olivier et al. | 296/107.07 |
| 2,897,003 A | * | 7/1959 | Lelli et al. | 296/117 |
| 3,251,625 A | * | 5/1966 | Adamski | 296/117 |
| 3,442,551 A | * | 5/1969 | Hussey | 296/117 |
| 3,453,021 A | * | 7/1969 | Adamski | 296/117 |
| 4,958,882 A | * | 9/1990 | Kolb | 296/108 |
| 4,991,902 A | * | 2/1991 | Schrader et al. | 296/107.09 |
| 5,620,226 A | * | 4/1997 | Sautter, Jr. | 296/117 X |
| 6,270,143 B1 | * | 8/2001 | Heselhaus et al. | 296/107.01 |
| 6,322,130 B1 | * | 11/2001 | Wanden et al. | 296/107.09 X |

* cited by examiner

Primary Examiner—Stephen T. Gordon
Assistant Examiner—Jason Morrow
(74) Attorney, Agent, or Firm—Jordan and Hamburg LLP

(57) ABSTRACT

For a convertible vehicle with a foldable at least partially flexible roof where longitudinal side support components and between these, cross-connecting supports are arranged for the support of at least the flexible roof section, at least one bow is arranged in a longitudinally moveable fashion with regard to the longitudinal side support components and in a movable fashion subject to the opening or closing of the roof via at least one control device.

19 Claims, 9 Drawing Sheets

Figure 1:
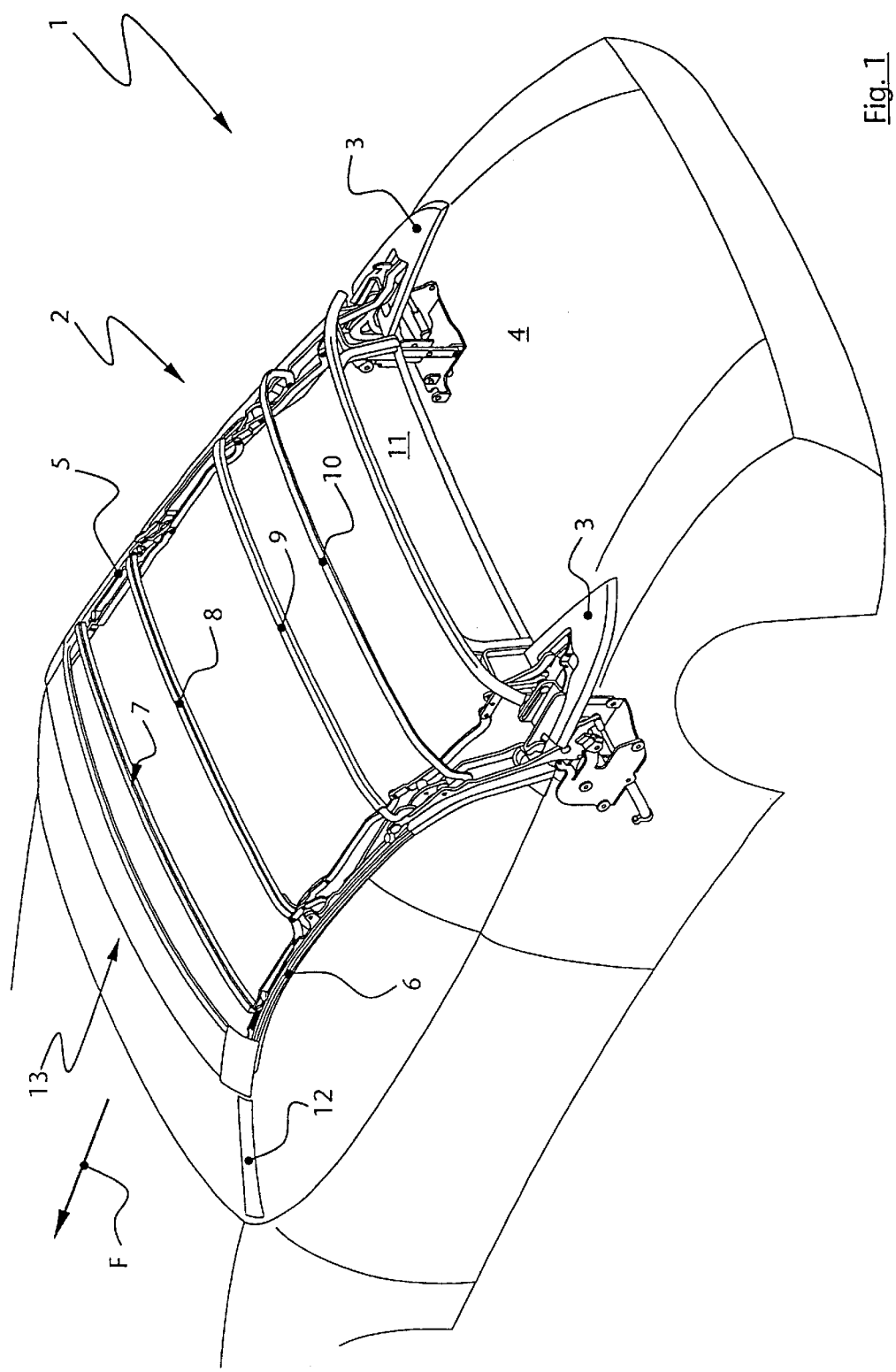

CONVERTIBLE VEHICLE WITH AN AT LEAST PARTIALLY FLEXIBLE ROOF AND AT LEAST ONE CROSS-CONNECTING SUPPORT

BACKGROUND OF THE INVENTION

The invention relates to a convertible vehicle with an at least a partially flexible roof and at least one cross-connecting support.

SUMMARY OF THE INVENTION

With convertible vehicle tops that are at least partially flexible, and whereby regions of the side edges of the top are tautened around longitudinal support components that serve as a frame, and wherein at least one but generally more cross supports, so-called bows, are suspended between these longitudinal supports, it is necessary to arrange the bows at certain longitudinal positions in the vehicle. For example, for optimal tensioning and shaping of the soft top, when using several bows, it is desirable to have the first bow arranged behind the roof's front, frame-like cross termination that in the closed position of the roof is connected with the windshield at about the same longitudinal distance to the roof termination as to the subsequent bow.

In relation to the longitudinal side support components, the bows are arched towards the top to enable the tautness of the roof. Due to this design, the bows of various roof sections may collide when unfolding the roof, particularly the bows of the first roof section that is located closest to the windshield frame with those of the adjacent rear roof section.

It is the object of the invention to provide an improvement to this situation.

By making at least one bow longitudinally movable, it can be arranged that it assume a different longitudinal position in the closed position of the roof than it does in the open position. In this manner, it can be positioned optimally for the tautness of the soft top, while still being able to avoid a collision with another bow or a fixed roof frame component when folding down the rooftop. To this end, a control device is provided that becomes effective in relation to the opening and closing of the roof, preferably a mechanical pull and push rod, for example. This results in a forced movement of the bow during the opening and closing of the soft top. No additional drive or control elements that might need to be operated by the driver, for example, are required to accomplish the shifting of the bow. Rather, when opening the soft top, the control device forces the shift in the same manner as in the subsequent closing movement into the earlier position.

Additionally, the pull and push rod may be able to intercept a side force component, for example, if the movement of the longitudinal side support components does not only take place in the longitudinal direction of the vehicle but also includes a cross-component to increase the shoulder width.

Additional advantages and details of the invention will become more readily apparent from the following description of an exemplary embodiment of the invention.

IN THE DRAWINGS

Figure 2:
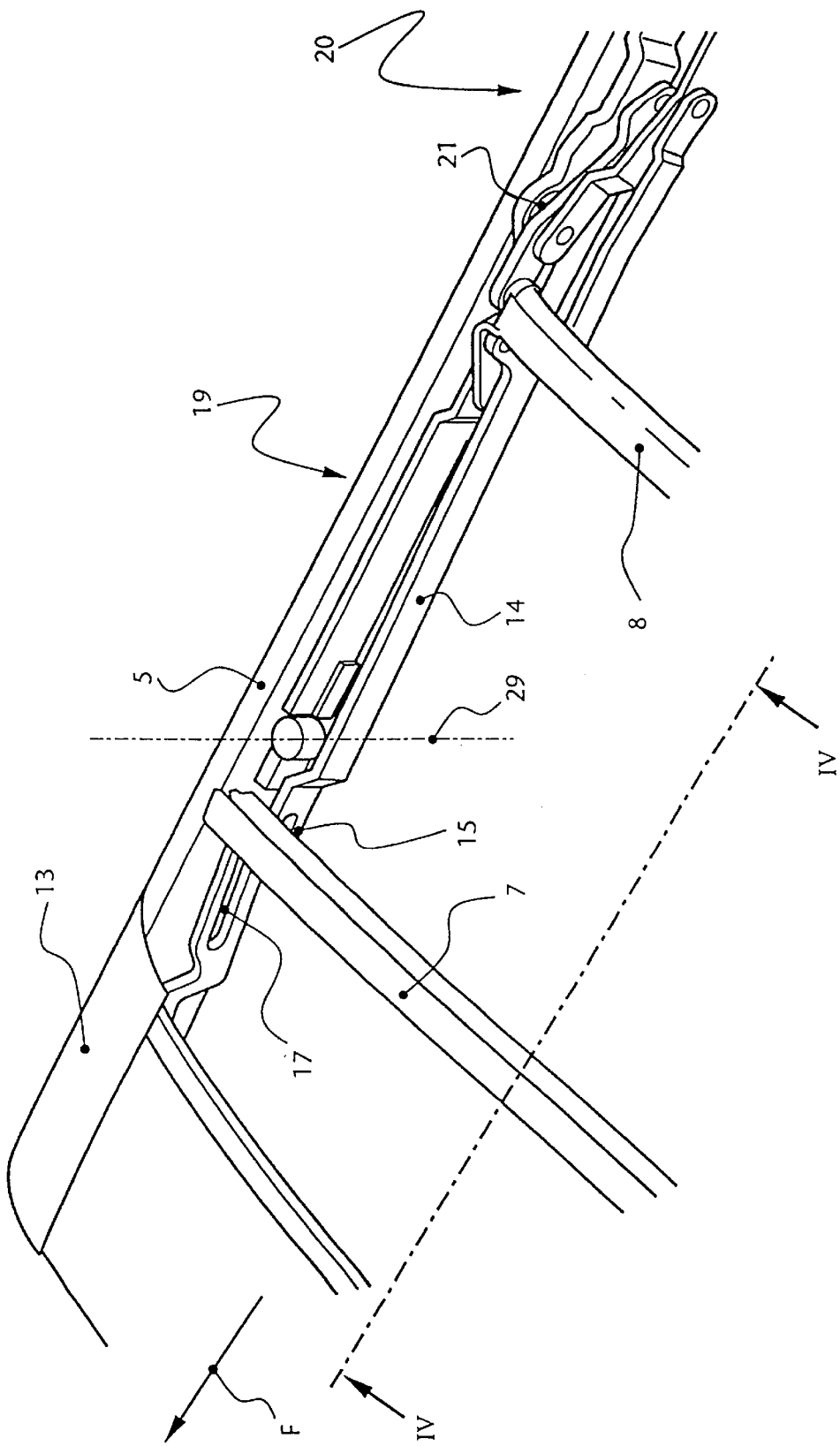
Figure 3:
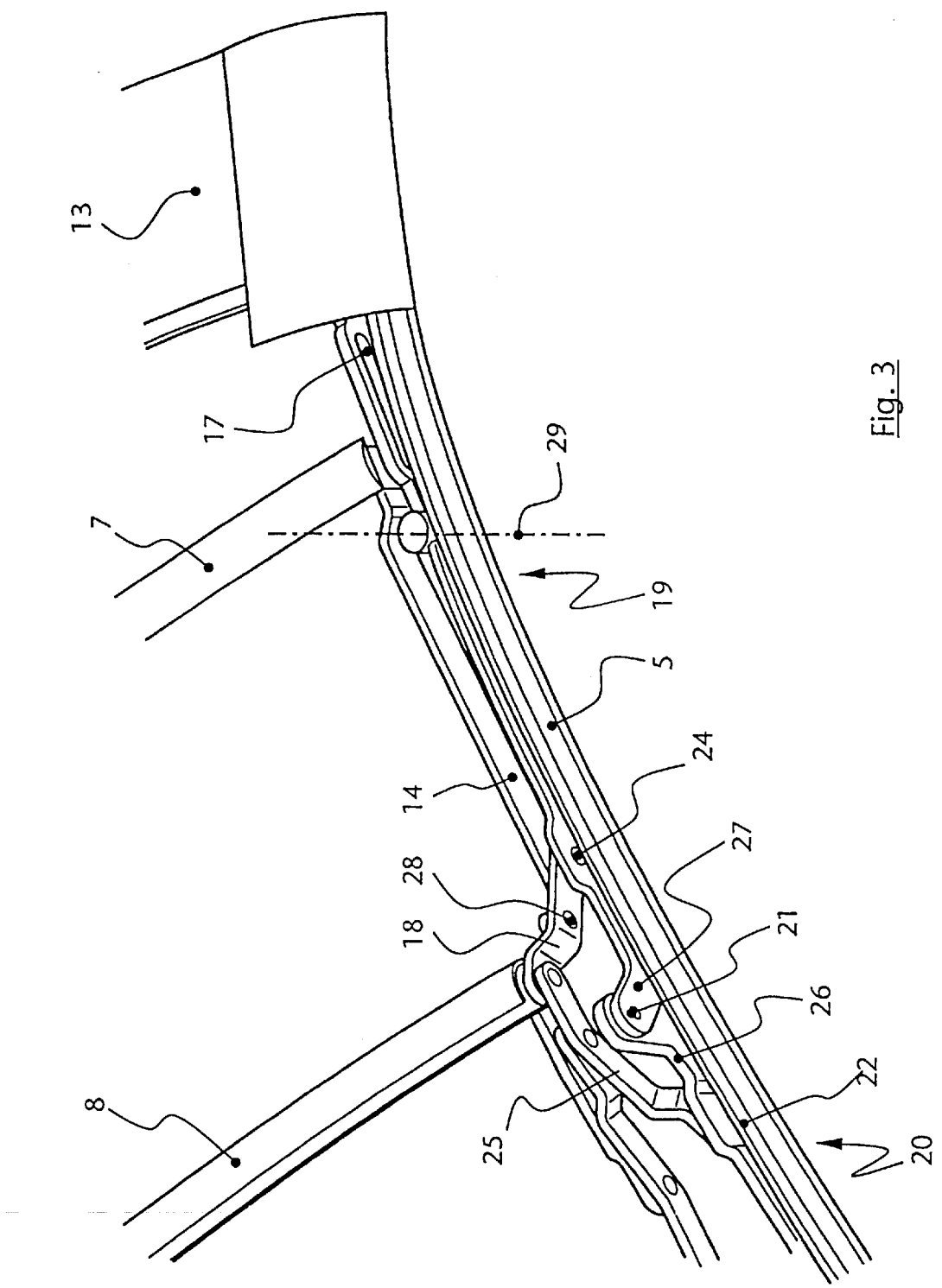
Figure 4:
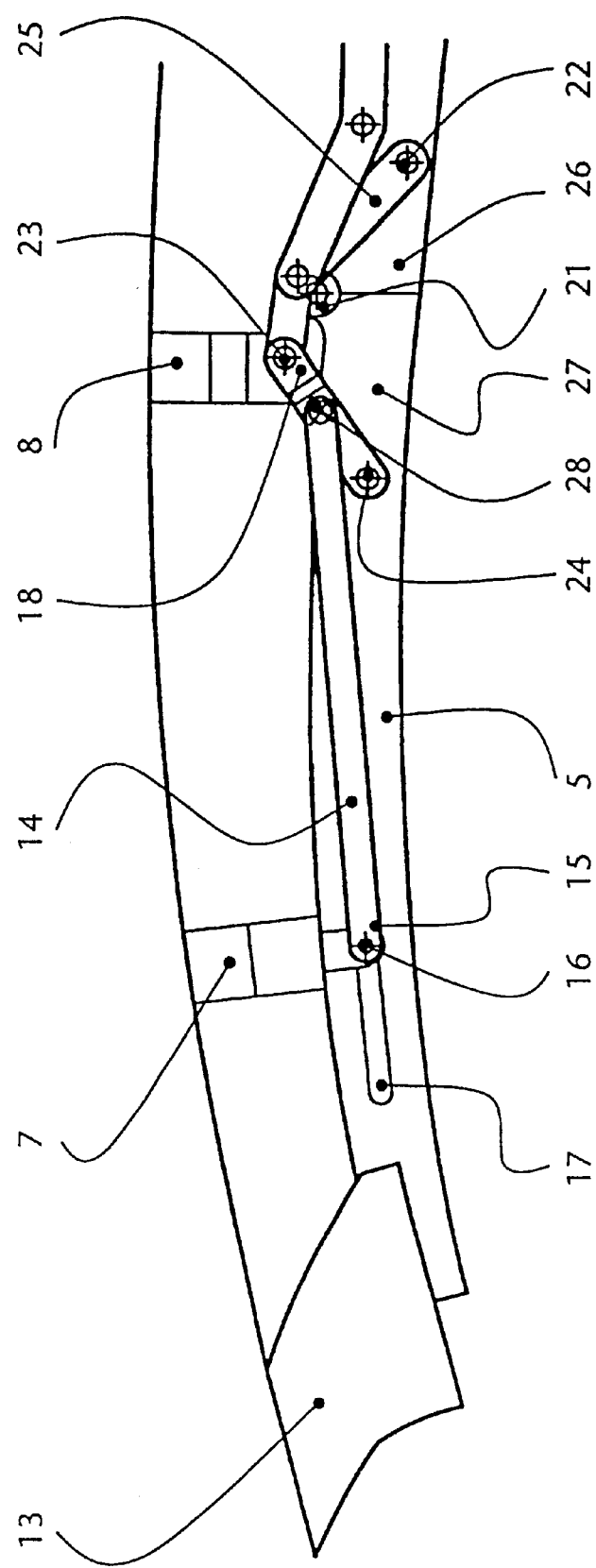
Figure 5:
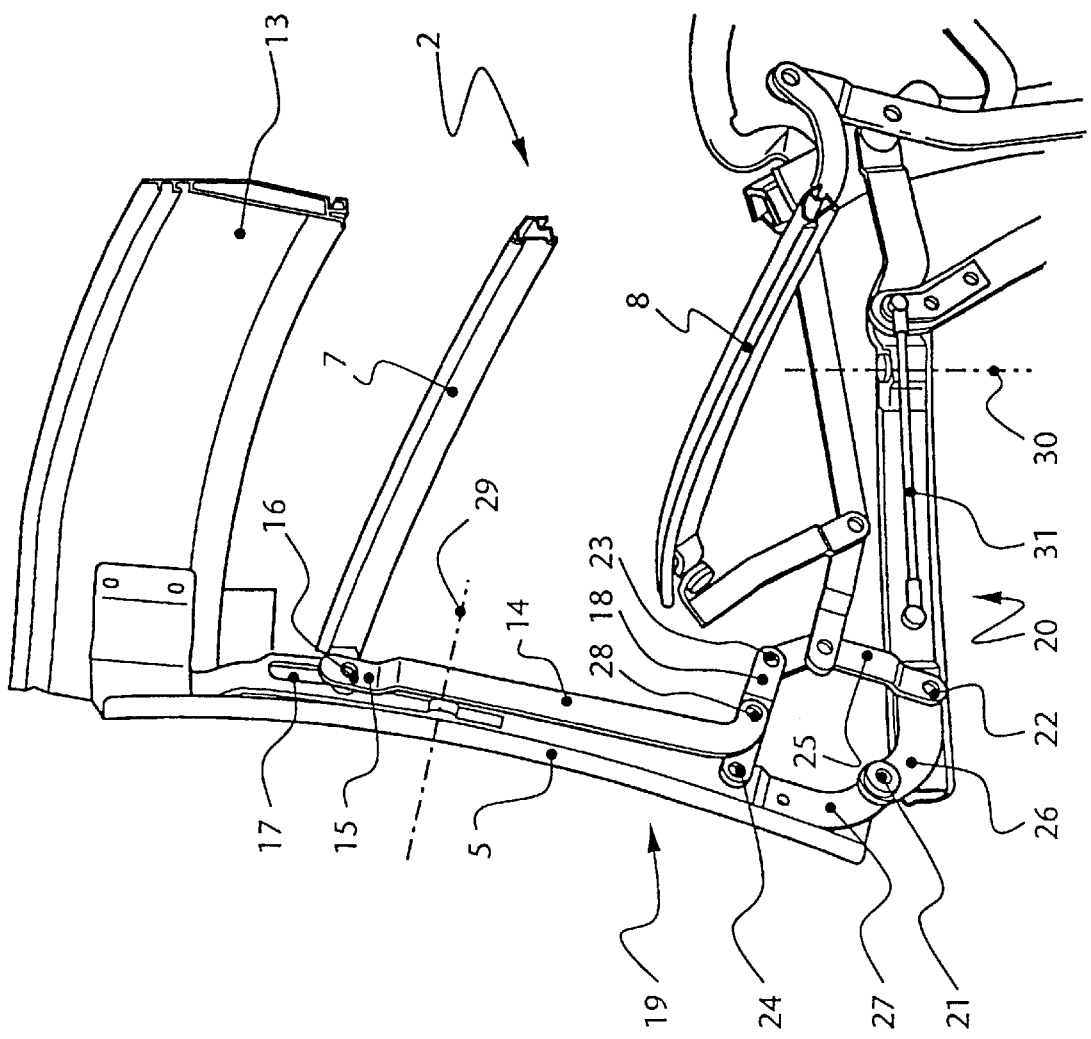
Figure 6:
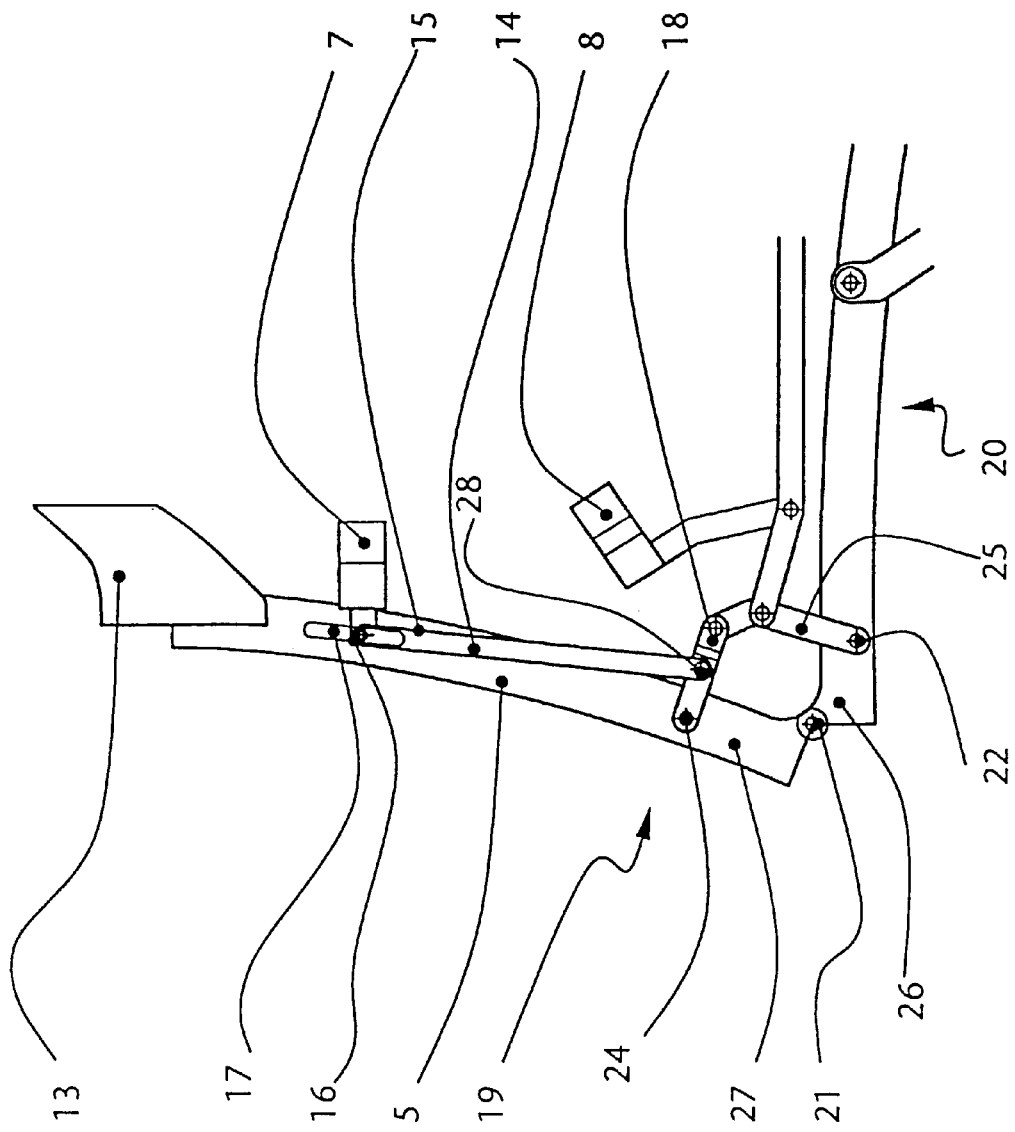
Figure 7:
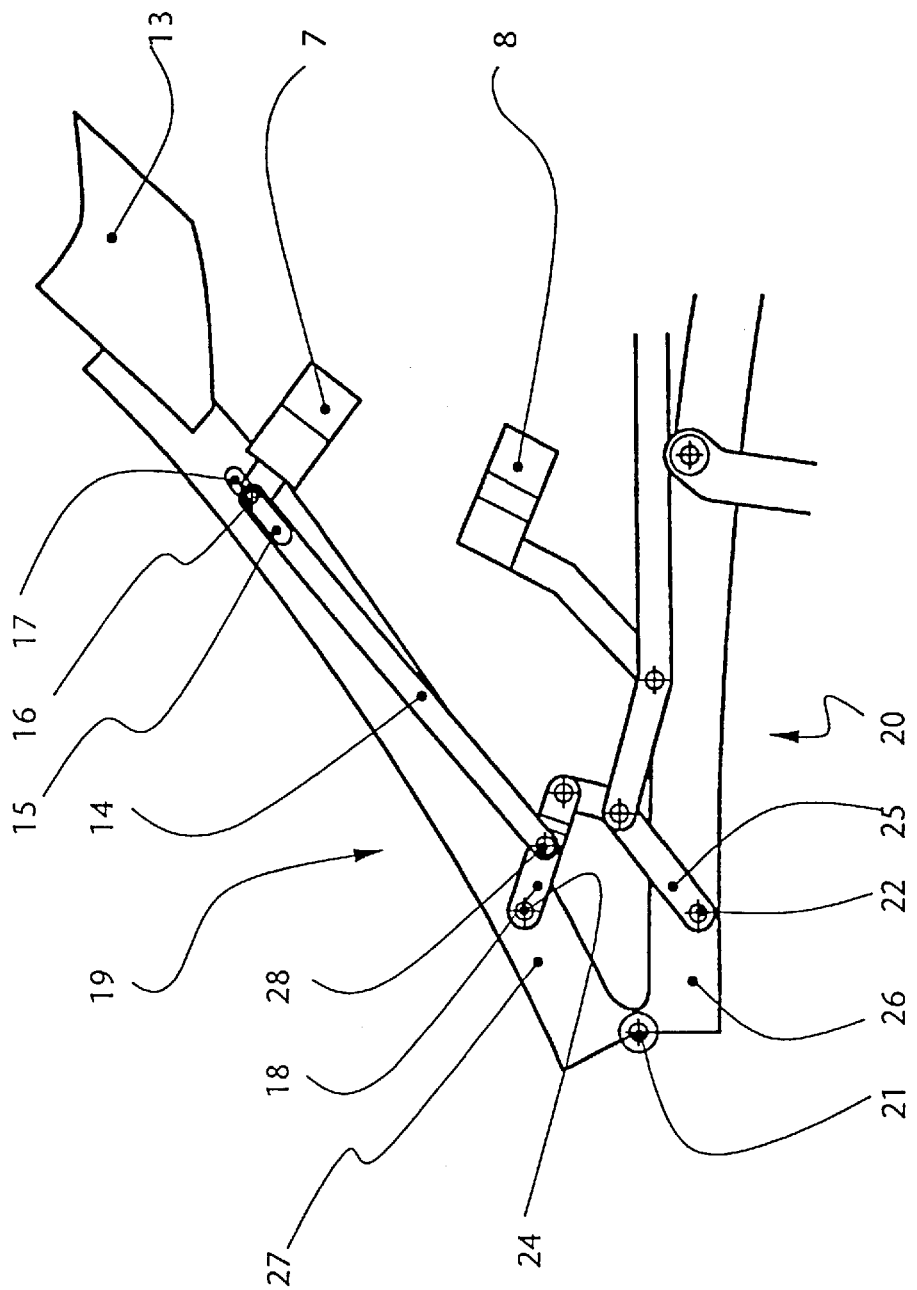
Figure 8:
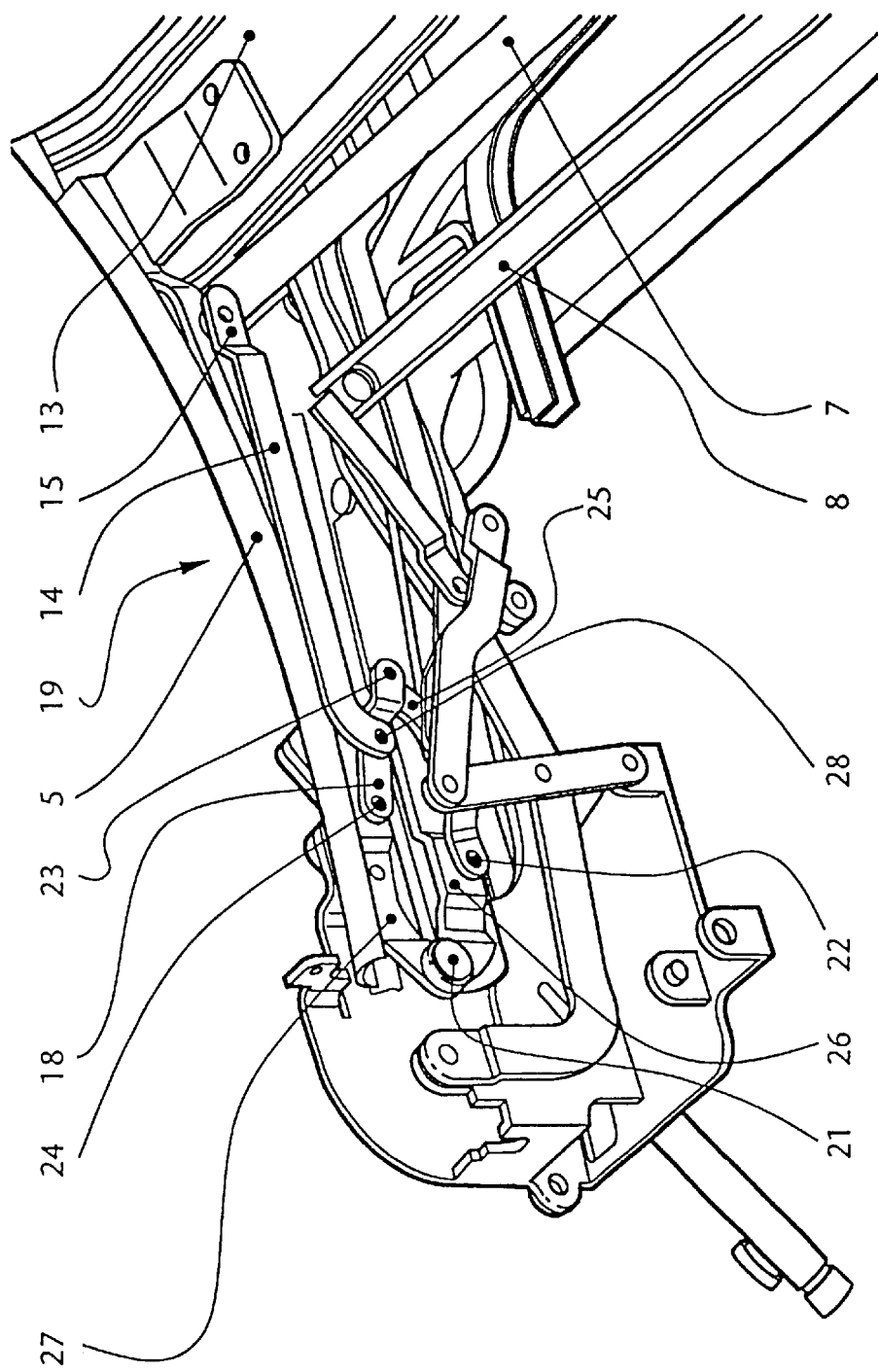
Figure 9:
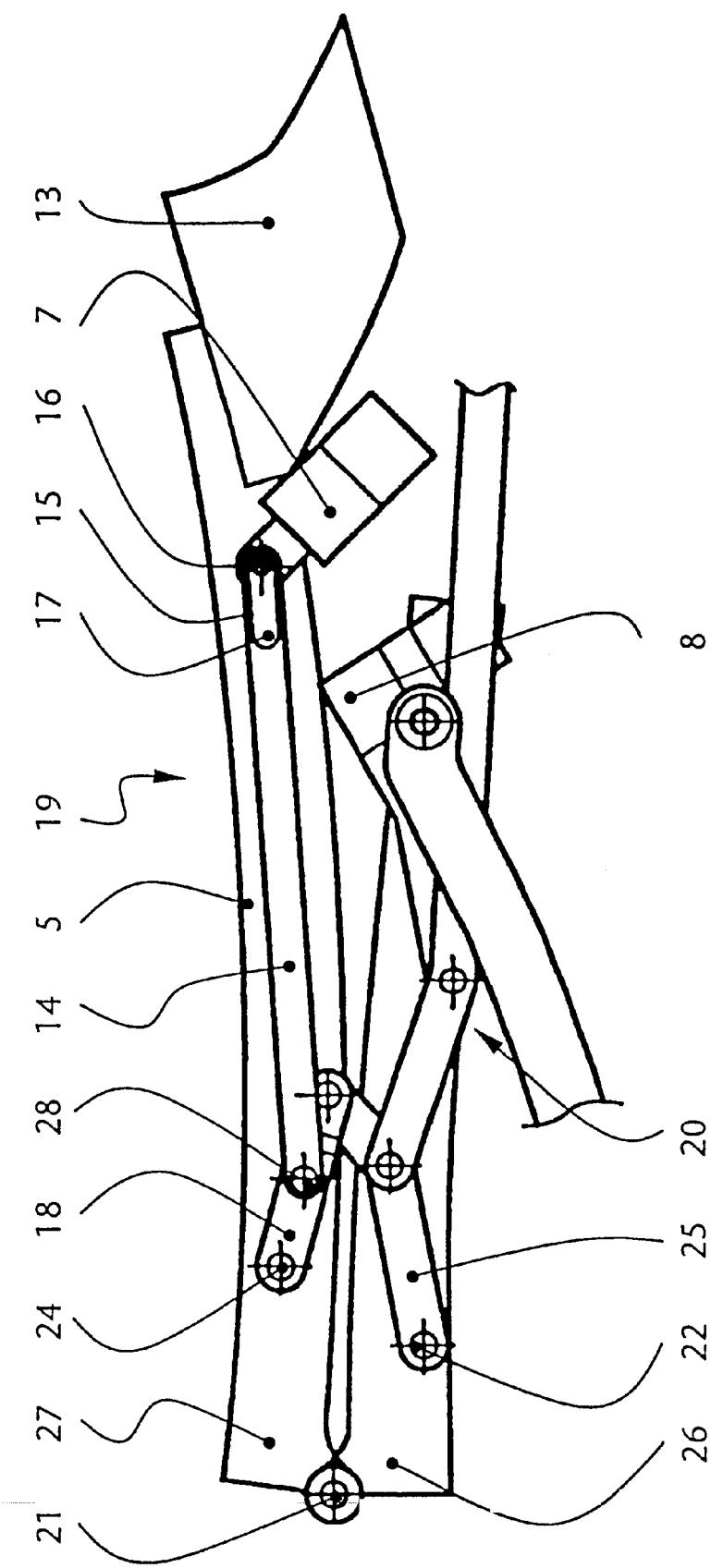

FIG. 1 shows a general schematic view of a soft-top frame of a convertible vehicle subject to the invention, FIG. 2 shows a section of the front area of this soft-top frame in the closed position of the roof, FIG. 3 shows the front area according to FIG. 2 in a generally opposite view, FIG. 4 shows a section along the line IV—IV of FIG. 2, FIG. 5 shows a perspective view of the front soft-top frame section during the opening movement of the soft top, FIG. 6 shows a schematic side view of front soft-top frame section according to FIG. 5, FIG. 7 shows a similar view as FIG. 6 in a progression of the opening movement of the soft top, FIG. 8 shows a cut view of the soft-top frame in the fully open position, and FIG. 9 shows a schematic side view of the position of the soft-top frame according to FIG. 8.

DESCRIPTION OF THE PREFERRED EMBODIMENTS

The convertible vehicle 1 according to the exemplary embodiment includes a so-called fin-top 2, which means that two side holder brackets 3 are provided in the rear section of the soft top 2, where in a top view the said holder brackets each have a triangular shape and tauten portions of the soft top material—not shown—on the rear of the vehicle 4. Here, the soft top is designed as a textile folding-top that is tautened across cross-supports 7, 8, 9 and 10 on linkage rods provided with longitudinal side support components 5 and 6. For a convertible vehicle subject to the invention, it is also possible to provide tops that are stiff in some areas. In such a convertible vehicle 1 as shown here, a rear window 11 stands essentially vertically between the holder brackets 3 and is positioned in front of them when viewed in the driving direction F. Even for conventional soft tops, the design subject to the invention may be advantageous.

In the closed position, the roof 2 is docked against the windshield frame 12 using a front cross roof termination 13, for example, a panel component.

Bows 7, 8, 9, 10 are arched and positioned in such a way that at least in the longitudinal center plane of the vehicle they stretch to above the longitudinal side support components 5, 6 to tauten the top material to give it its final domed shape.

According to the exemplary embodiment, the front bow 7 that forms the first bow behind the cross roof termination 13 is arranged so that it is longitudinally movable in relation to the longitudinal side support components 5, 6 that carry the bow.

A control device 14, for example a separate drive, a spring or the like and in the exemplary embodiment, a pull and push rod 14 is provided to achieve the longitudinal shifting. With the closed top 2, the rod is positioned parallel to the longitudinal direction of the longitudinal side support components 5, 6. With its front end 15, when viewing a closed top in the driving direction F, the pull and push rod 14 is supported by shaft stubs 16 that are used to support the first bow 7 in a guide block 17 on the side component and that allows the stub shafts 16 to shift. At the other end, the pull and push rod is attached to a guide 18 in a pivoting manner, whereby the guide 18 is a part of a four bar linkage 21, 22, 23, 24 that connects the first two roof sections 19, 20. The four bar linkage includes the main linkage 21 that separates the frame components 5 as well as three additional linkages 22, 23, and 24 that serve the purpose of connecting the guides 18, 25, 26 and 27. When opening the soft top 2, the guides 18 25, 26, 27, are moved from their almost parallel position in the closed position to a position (FIG. 5) that is open to one another. In this manner, the pivot shaft 28 of the pull and push rod 14 shifts relative to the longitudinal side support component 5 in the direction towards the cross roof termination 13, so that the front end 15 of the push rod 14 moves the shaft stub 16 that is supported in the longitudinal guide block 17 in the direction of the front end of the roof 13.

In the closed position of the soft top 2 (FIGS. 2 to 4), the shaft stubs 16 that support the bow 7 in the guide block 17 are in their rear end position and when opening the roof, will be pushed in the direction of the front end of the roof 13 by the lever movement of the guide 18 and the resulting thrust force of the pull and push rod 14, so that with the continued upswing, the shaft stubs will finally have been moved into their front positions in the guide block 17 and will stay there with the folded up position of the front roof sections 19 and 20. This avoids a collision of the bows 7 and 8 that are in this manner placed parallel to each other as can be seen in FIG. 8, and therefore are not able to lie on top of one another or collide with one another. This can also ensure geometries of roofs that are optimized with regard to a closed roof position, but would cause problems upon unfolding, because the overall height with bows on top of one another would be to great. It can be ensured that the distance between the front bow 7 and the front roof termination 13 is not significantly smaller than that between the front bow 7 and the subsequent bow 8. Still, in the laid down position of the roof 2 (FIG. 8, FIG. 9), the front bow 7 can be moved far enough in the direction of the front roof end 13 that it is placed behind the subsequent bow 8 viewed in the driving direction F. Such movability in the longitudinal direction can be provided for several bows 7, 8, 9, 10 as well or only for one bow 8, 9, 10 that is not necessarily the first one in the driving direction F.

In addition to the movability in the longitudinal direction, the exemplary embodiment provides that the longitudinal side support components 5 and 6 are separated at pivoting shafts 28, 29 that are positioned essentially perpendicular to their direction, and that an inward cross movement acts upon the areas of the four bar linkage 21, 22, 23 and 24 that are located between the pivoting shafts 29, 30 via an additional pull and push rod 31 that is effective during the opening movement of the roof, in order to enlarge the available width for the passengers when the soft top is open. To be able to intercept the additional cross movement component, the pull and push element 14 is attached to the shaft stubs 16 via pivoting linkage supports.

What is claimed is:

1. An operable mechanisms for use with a roof for a convertible vehicle in which the roof is movable between up and down positions, comprising generally elongated side supports extending generally in a direction from front to rear of the vehicle when the roof is in the up position, at least one cross support extending generally transversely of said side supports, mounting portions movably mounting said at least one cross support on said side supports to provide for displacement of said at least one cross support relative to the elongated extent of said side supports, and a control device which effects said displacement when said roof is moved between said up and down positions.

2. A convertible mechanism according to claim 1 wherein said control device comprises a generally elongate link member disposed generally parallel to at least a portion of said side member.

3. A convertible mechanism according to claim 2 wherein said mounting portions includes a link connection which connects said link member to said at least one cross member and a multi-linkage connection which connects said link member to said side members.

4. A convertible mechanism according to claim 3 wherein said multi-linkage connection is operable to displace said link member relative to the elongated extent of said side support.

5. A convertible mechanism according to claim 1 wherein each of said side supports comprise generally elongate first and second side support sections and a pivot connection pivotably connecting said first and second side support sections, said first side support section being pivotal relative to said second side support section about said pivotal connection between an operable position and a folded position, said first and second side support sections being disposed at a first angle relative to one another when said first side support section is in said operable position, said first and second side support sections being disposed at a second angle relative to one another when said first side support section is in said folded position, said first angle being different from said second angle.

6. A convertible mechanism according to claim 5 wherein said first angle is a substantially straight angle.

7. A convertible mechanism according to claim 5 said control device is operable to dispose said first side support section in said operable position when said roof is in said up position and to dispose said first side section in said folded position when said roof is in said down position.

8. A convertible mechanism according to claim 5 wherein said mounting portions mount said at least one cross support on said first side section to dispose said at least one cross support in a first position on said first side support section when said first side section is in said operable position and to dispose said at least one cross support in a second position on said first side section when said first side section is in said folded position, said first position being spaced from said second position along the elongated extent of said first side section.

9. A convertible mechanism according to claim 8 wherein said mounting portions includes an elongate guide and a sliding part slidable in said guide.

10. A convertible mechanism according to claim 9 wherein said guide is provided on said first side support section and said at least one cross member is connected to said sliding part.

11. A convertible mechanism according to claim 9 wherein said mounting portions enable displacement of said sliding part relative to said elongate guide in a direction generally lateral to the elongate extent of said elongate guide.

12. A convertible mechanism according to claim 9 wherein said control device includes a link member operably connected to said sliding part and a multi-linkage connecting said link member to said first and second side support sections.

13. A convertible mechanism according to claim 12 wherein said multi-linkage includes a first lever pivotably connected to said first side support section, a second lever pivotably connected to said second side support section, a lever pivot pivotably connecting said first and second levers, and a link pivot pivotably connecting said link member to said first lever.

14. A convertible mechanism according to claim 5 wherein said at least one cross support is designated a first cross support and further comprising a second cross support mounted on said side first side support section, said second cross support being disposed forwardly of said first cross support when said first side support section is in said operable position, said second cross support being disposed rearwardly of said first cross support when said first cross support is in said folded position.

15. A convertible mechanism according to claim 14 further comprising a third cross support and a pivotal mounting between said third cross support and said control device, said third cross support being disposed rearwardly of the first cross support when the first side support section is in said operable position, said third cross support being disposed forwardly of the first cross support when the first side support section is in said folded position.

16. An operable mechanism for use with a roof for a convertible vehicle in which the roof is movable between up and down positions, comprising generally elongated side supports extending generally in a direction from front to rear of the vehicle when the roof is in the up position, each of said side supports comprising generally elongate first and second side support sections and a pivot connection pivotably connecting said first and second side support sections, said first side support section being pivotal relative to said second side support section about said pivotal connection between an operable position and a folded position, said first and second side support sections being disposed at a first angle relative to one another when said first side support section is in said operable position, said first and second side support sections being disposed at a second angle relative to one another when said first side support section is in said folded position, said first angle being different from said second angle, at least one cross support extending generally transversely of said elongated side supports, mounting portions movably mounting said at least one cross support on said first side support section to provide for displacement of said at least one cross support relative to the elongated extent of said first side support section, and a control device which effects said displacement when said roof is moved between said up and down positions, said control device being operable to dispose said first side support section in said operable position when said roof is in said up position and to dispose said first side section in said folded position when said roof is in said down position.

17. A convertible mechanism according to claim 16 wherein said mounting portions include an elongate guide on said first side support section and a sliding part connected to said at least one cross member and slidable on said guide.

18. A convertible mechanism according to claim 17 wherein said control device includes a link member operably connected to said sliding part and a multi-linkage connecting said link member to said first and second side support sections, said multi-linkage including a first lever pivotably connected to said first side support section, a second lever pivotably connected to said second side support section, a first pivot connection pivotably connecting said first and second pivot levers, and a second pivot connection pivotably connecting said link member to said first lever.

19. A convertible mechanism according to claim 16 wherein said multi-linkage includes a first lever pivotably connected to said first side support section, a second lever pivotably connected to said second side support section, a first pivot connection pivotably connecting said first and second levers, and a second connection pivot pivotably connecting said link member to said first lever.

* * * * *

UNITED STATES PATENT AND TRADEMARK OFFICE
CERTIFICATE OF CORRECTION

PATENT NO. : 6,409,247 B1  
DATED : June 25, 2002  
INVENTOR(S) : Joachim Maass

It is certified that error appears in the above-identified patent and that said Letters Patent is hereby corrected as shown below:

<u>Title page,</u>
Item [30], insert the Foreign Application Priority Data information as follows:

-- [30] Foreign Application Priority Data
    December 24, 1999 (DE) . . . . . . . . . . . . . 199 62 994.3 --

Signed and Sealed this

Seventeenth Day of December, 2002

JAMES E. ROGAN
*Director of the United States Patent and Trademark Office*